United States Patent
Kathail et al.

(10) Patent No.: US 11,949,593 B2
(45) Date of Patent: Apr. 2, 2024

(54) STATELESS ADDRESS TRANSLATION AT AN AUTONOMOUS SYSTEM (AS) BOUNDARY FOR HOST PRIVACY

(71) Applicant: Cisco Technology, Inc., San Jose, CA (US)

(72) Inventors: Pradeep Kumar Kathail, Los Altos, CA (US); Eric Voit, Bethesda, MD (US); David A. Maluf, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/740,903

(22) Filed: May 10, 2022

(65) Prior Publication Data

US 2023/0370373 A1 Nov. 16, 2023

(51) Int. Cl.
*G06F 15/173* (2006.01)
*G06F 15/16* (2006.01)
*H04L 45/42* (2022.01)
*H04L 45/741* (2022.01)
*H04L 45/748* (2022.01)
*H04L 61/251* (2022.01)

(52) U.S. Cl.
CPC ............ *H04L 45/741* (2013.01); *H04L 45/42* (2013.01); *H04L 45/748* (2013.01); *H04L 61/251* (2013.01)

(58) Field of Classification Search
CPC ..... H04L 45/741; H04L 45/748; H04L 45/42; H04L 61/251
USPC .................................. 709/238–239, 245–246
See application file for complete search history.

(56) References Cited

U.S. PATENT DOCUMENTS

| | | | |
|---|---|---|---|
| 9,143,429 B2* | 9/2015 | Padgett | H04L 45/50 |
| 10,110,711 B2* | 10/2018 | Donley | H04L 61/2521 |
| 11,109,269 B2* | 8/2021 | Wu | H04L 45/741 |
| 2002/0165912 A1* | 11/2002 | Wenocur | H04L 51/00 709/203 |
| 2009/0106453 A1* | 4/2009 | Miura | H04L 61/5076 709/245 |
| 2012/0127997 A1* | 5/2012 | Zinjuwadia | H04L 45/54 370/392 |
| 2012/0207168 A1 | 8/2012 | Kassi Lahlou et al. | |
| 2013/0301650 A1 | 11/2013 | Zou et al. | |

(Continued)

OTHER PUBLICATIONS

Kim, Myung-Sup et al.; "Flow-based Characteristic Analysis of Internet Application Traffic"; Department of Computer Science and Engineering, Pohang University of Science and Technology; School of Computer Science, University of Waterloo (Jan. 2004) (6 pages).

*Primary Examiner* — Bharat Barot
(74) *Attorney, Agent, or Firm* — Merchant & Gould P.C.

(57) ABSTRACT

Stateless address translation at an Autonomous System (AS) boundary for host privacy may be provided. An address associated with a host device in the AS may be received. The address may comprise a network prefix and an interface identifier (ID). Then a cypher value may be assigned to a cypher bit range in the network prefix. The cypher value may be associated with a first cypher algorithm of a plurality of cypher algorithms. Next, the address may be encoded wherein encoding the address comprises applying the first cypher algorithm to encode a coding bit range in the address that is less significant than the cypher bit range. The encoded address may then be used for flows from the host that egress the AS.

20 Claims, 5 Drawing Sheets

(56) References Cited

U.S. PATENT DOCUMENTS

| | | | |
|---|---|---|---|
| 2014/0019686 A1* | 1/2014 | Dong | G06F 12/0864 |
| | | | 711/128 |
| 2017/0012937 A1 | 1/2017 | Dinha et al. | |
| 2020/0125501 A1* | 4/2020 | Durham | H04L 9/0861 |
| 2020/0252377 A1 | 8/2020 | Vyncke et al. | |
| 2020/0287827 A1 | 9/2020 | Brzozowski et al. | |

* cited by examiner

| Cypher Value | Currently Active? | Cypher Algorithm Plus Hash |
|---|---|---|
| 0000 | Never | Reserved for Unnatted Hosts |
| 0001 | Yes | Spec Cypher, and Seed |
| 0010-1011 | Yes | ARX (add-rotate-XOR) Cypher |
| 1100-1110 | Inactive | Empty, will Shift into use Periodically |
| 1111 | Yes | ARX (add-rotate-XOR) Cypher |

STATELESS ADDRESS TRANSLATION AT AN AUTONOMOUS SYSTEM (AS) BOUNDARY FOR HOST PRIVACY

TECHNICAL FIELD

The present disclosure relates generally to stateless address translation.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet. Client address based forwarding of Dynamic Host Configuration Protocol (DHCP) response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Stateless address translation at an Autonomous System (AS) boundary for host privacy may be provided. An address associated with a host device in the AS may be received. The address may comprise a network prefix and an interface identifier (ID). Then a cypher value may be assigned to a cypher bit range in the network prefix. The cypher value may be associated with a first cypher algorithm of a plurality of cypher algorithms. Next, the address may be encoded wherein encoding the address comprises applying the first cypher algorithm to encode a coding bit range in the address that is less significant than the cypher bit range. The encoded address may then be used for flows from the host that egress the AS.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Privacy may be important with networks and devices on networks. For example, some devices may rotate (i.e., randomize) Media Access Control (MAC) addresses on access networks so that identity may not be easily tracked (i.e., identity obfuscation). This randomization may devalue network identity. Devaluing network identity may also devalue the benefit of equipment provided by a particular manufacturer. Accordingly, it may be valuable for a manufacturer to provide an identity obfuscation process for Internet Protocol (IP) addresses so that data center providers may not glean information about the networks or devices simply by the topology of the exposed IP addresses. In other words, it may be valuable to have an inexpensive way to allow network providers to avoid leaking identity and topology information should they consider this information valuable or profitable.

Carrier Grade Network Address Translation (CGNAT) may be used to scale IP address ranges due to the limits on IPv4 address space. However, CGNAT may also be used to provide the aforementioned identity obfuscation, for example, to help protect location-based privacy of a host device. In this way, embodiments of the disclosure may: i) provide host location privacy without the needing to scale the address space; ii) ensure that a customer host device may have a rotating randomized source address that is opaque to anyone outside of an Autonomous System (AS); and iii) allow each flow returning to a host device to go statelessly though any Autonomous System Boundary Router (ASBR), where the ASBR may run a stateless operation to determine the original address. As a result, embodiments of the disclosure may allow a source host device's IP address to be an unreliable source of identity. Thus, it may hinder a data center provider from understanding and profiting from the behaviors of users by dimensioning traffic to and from specific IP addresses. Consequently, a process may be provided to break the privacy/connectivity model with the data center so that network state may not be maintainable outside of some secret delivered in a Transport Layer Security (TLS) encrypted application payload that may allow correlation with previous transactions.

Figure 1:
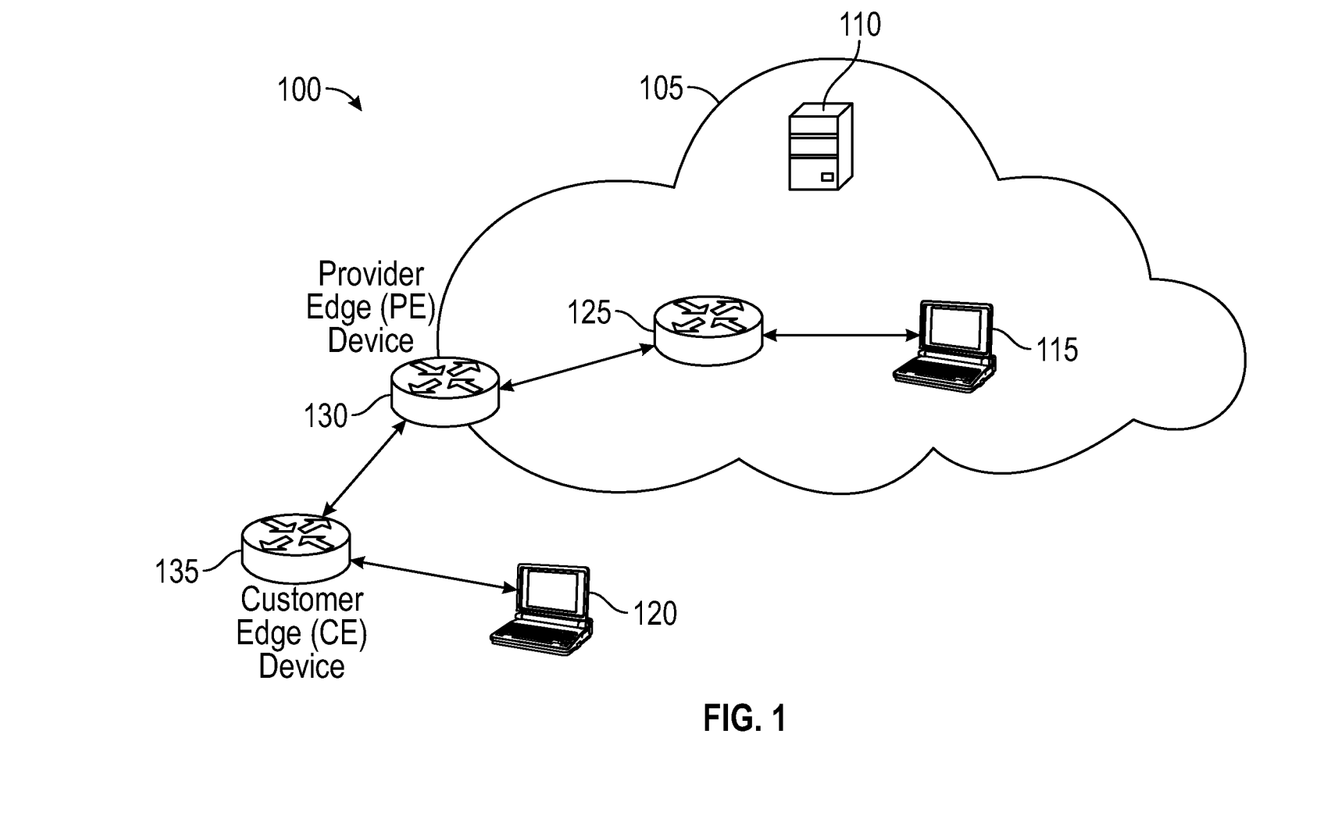
FIG. 1 is a block diagram of an operating environment for providing stateless address translation at an Autonomous System (AS) boundary for host privacy.

FIG. 1 shows an operating environment 100 for providing stateless address translation at an Autonomous System (AS) boundary for host privacy. As shown in FIG. 1, operating environment 100 may comprise an AS 105, a plurality of network devices, a Dynamic Host Configuration Protocol (DHCP) server 110, a first host device 115, and a second host device 120. The plurality of network devices may comprise a first network device 125, a Provider Edge (PE) device 130, and a Customer Edge (CE) device 135.

AS 105 may comprise a collection of connected Internet Protocol (IP) routing prefixes under the control of one or more network operators on behalf of a single administrative entity or domain, that presents a common and clearly defined routing policy to the Internet. Each AS may be assigned an autonomous system number (ASN), for use in Border Gateway Protocol (BGP) routing. ASNs may then be assigned to Local Internet Registries (LIRs) and end user organizations by their respective Regional Internet Registries (RIRs), which in turn may receive blocks of ASNs for reassignment from the Internet Assigned Numbers Authority (IANA). The IANA may also maintain a registry of ASNs that may be reserved for private use. AS 105 may be controlled by an enterprise, for example, an Internet Service Provider (ISP) or a large organization with independent connections to multiple networks. The enterprise may wish to provide privacy for addresses of hosts inside the AS. As shown in FIG. 1, AS 105 may include first host device 115, first network device 125, and PE device 130.

DHCP server 110 may provide DHCP in operating environment 100. DHCP may comprise a network management protocol used on Internet Protocol (IP) networks for automatically assigning IP addresses and other communication parameters to devices connected to the network using a client-server architecture. This protocol may eliminate the need for individually configuring network devices manually, and may comprise two network components, a centrally installed network DHCP server and client instances of the protocol stack on each computer or device. When connected to the network, and periodically thereafter, a client may request a set of parameters from the DHCP server using the DHCP protocol.

The plurality of network devices may comprise, but are not limited to, switches and routers for example. Operating environment 100 may comprise any number of network devices and any number host devices. First host device 115 and second host device 120 may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), a Virtual reality (VR)/Augmented reality (AR) device, or other similar microcomputer-based device.

As described in more detail below, embodiments of the disclosure may provide a stateless process to hide the IP addresses of host devices (e.g., first host device 115) within AS 105, while retaining the efficiencies of the existing routing topologies outside AS 105. Embodiments of the disclosure may use a transform (e.g., a 4 bit transform) that may be signaled within the source IP address that starts a flow. This may be continually rotated so that host traffic patterns may not be easily statistically discovered over time outside AS 105.

The elements described above of operating environment 100 (e.g., DHCP server 110, first host device 115, second host device 120, first network device 125, PE device 130, and CE device 135) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Figure 2:
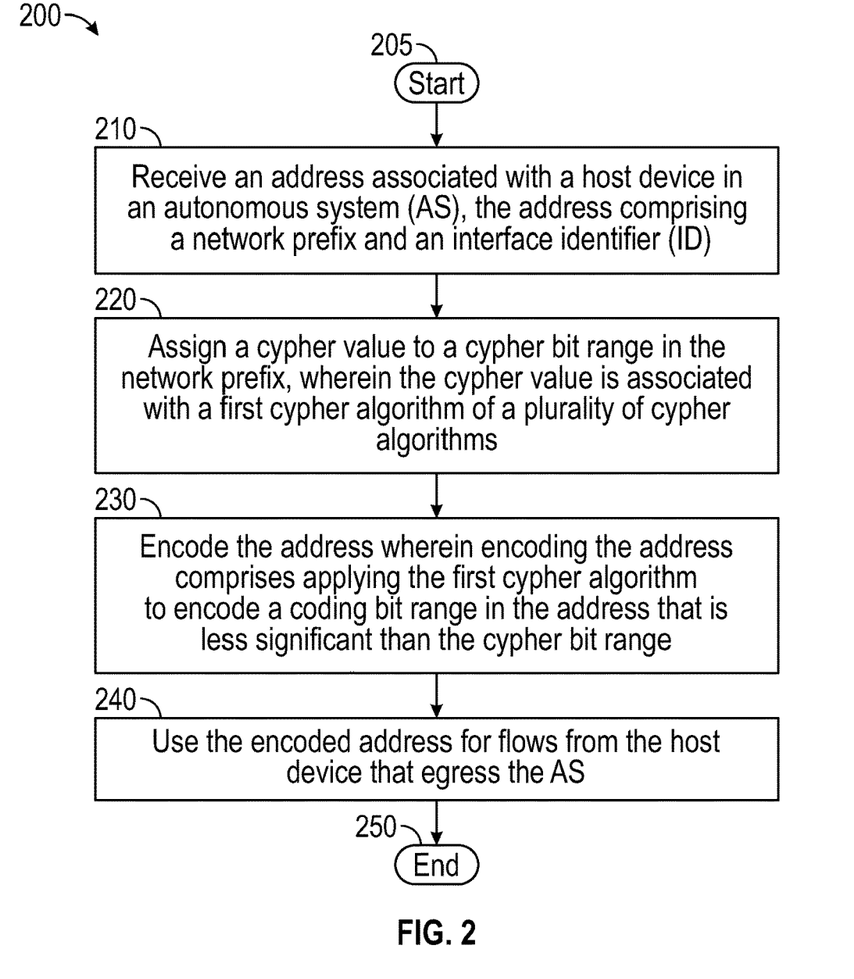
FIG. 2 is a flow chart of a method for encoding an address.

FIG. 2 is a flow chart setting forth the general stages involved in a method 200 consistent with an embodiment of the disclosure for encoding an address. Method 200 may be implemented using any of first host device 115, first network device 125, or PE device 130 any of which may be implemented by a computing device 600 as described in more detail below with respect to FIG. 6. Ways to implement the stages of method 200 will be described in greater detail below.

Figure 3:
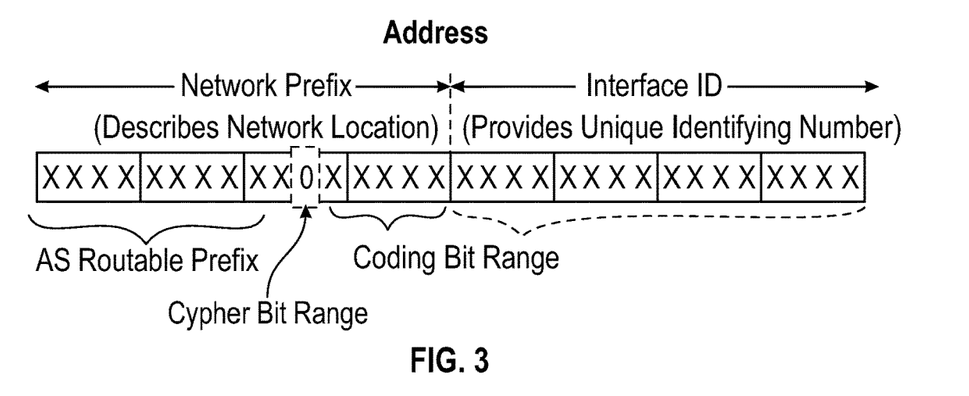
FIG. 3 illustrates an address.
Figure 6:
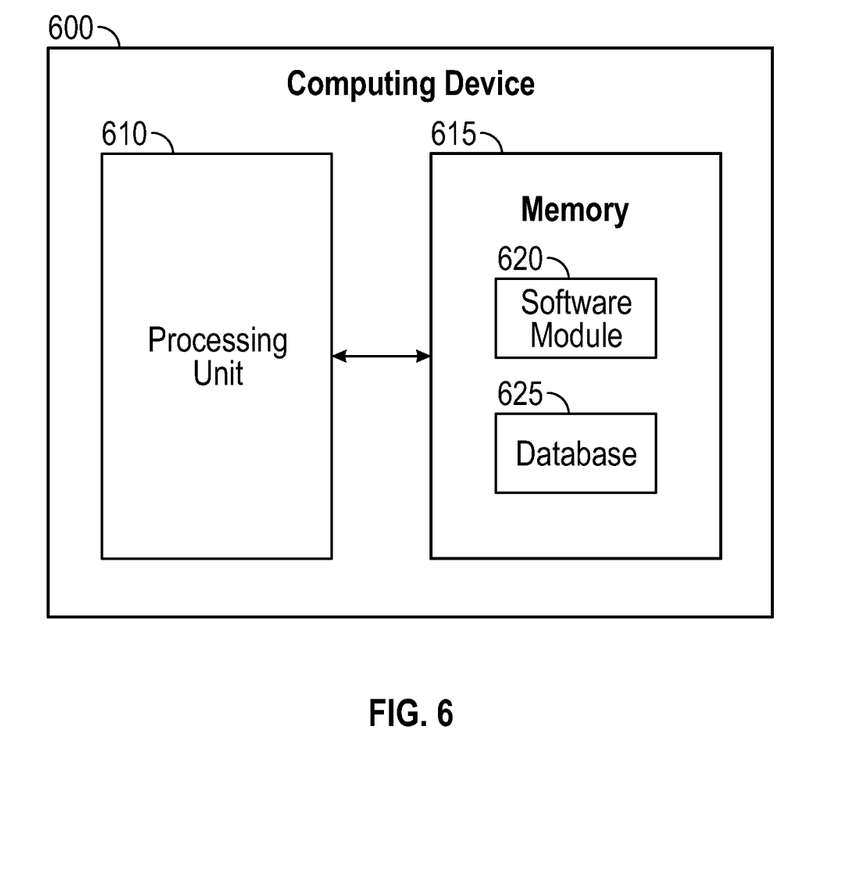
FIG. 6 is a block diagram of a computing device.

Method 200 may begin at starting block 205 and proceed to stage 210 where computing device 600 may receive an address associated with first host device 115 in AS 105. As shown in FIG. 3, the address may comprise a network prefix and an interface identifier (ID). The network prefix may describe a network location (e.g., for AS 105) and the interface ID may provide a unique identifying number. For example, FIG. 3 illustrates the format of a 128-bit IPv6 address that may be used for the address of first host device 115. Each "X" shown in the address of FIG. 3 may comprise 4 bits. Embodiments of the disclosure may use other address formats and are not limited to a 128-bit IPv6 address. This address may be provided by DHCP server 110, for example, however, other host IP address assignment processes may be used.

From stage 210, where computing device 600 receives the address associated with first host device 115 in AS 105, method 200 may advance to stage 220 where computing device 600 may assign a cypher value to a cypher bit range in the network prefix. The cypher value may be associated with a first cypher algorithm of a plurality of cypher algorithms as illustrated below with respect to FIG. 5. For example, because IPv6 addresses may be lightly utilized, embodiments of the disclosure may use a number of bits (e.g., 4 bits) of the IPv6 network prefix to encode a cryptographic fingerprint (i.e., secret) used at a network boundary (e.g., PE device 130). Then a new source address may be assigned to a packet (e.g., from first host device 115). When packets return to AS 105, the cryptographic fingerprint (e.g., the 4 bit fingerprint) may be statelessly used to recreate the original first host device 115 address via rotating cypher algorithm table as illustrated below with respect to FIG. 5. This may be applied at each boundary router (e.g., PE device 130) when a new flow matches a designated set of IPv6 network prefixes for example.

As shown in FIG. 3, the AS routable prefix may describe a network location (e.g., for AS 105). DHCP server 110 may provide the address of FIG. 3 to first host device 115. However, DHCP server 110 may initially provide the address with the cypher bit range having a predetermined reserved value. This predetermined reserved value (e.g., "0000") may be used to signal that that the cypher value associated with the first cypher algorithm should be placed in the cypher bit range replacing the predetermined reserved value. For example, when a new flow is seen from a source network address starting with the AS routable prefix (e.g., associated with AS 105) plus the predetermined reserved value (e.g., "0000"), embodiments of the disclosure may randomly select an active value for the cypher value from a cypher algorithm table 500 described below. This cypher value (e.g., a four bit value) may uniquely identify a current secret cypher algorithm plus a hash (i.e., seed, nonce) from a rotating set of algorithms that are unknown outside AS 105.

Figure 5:
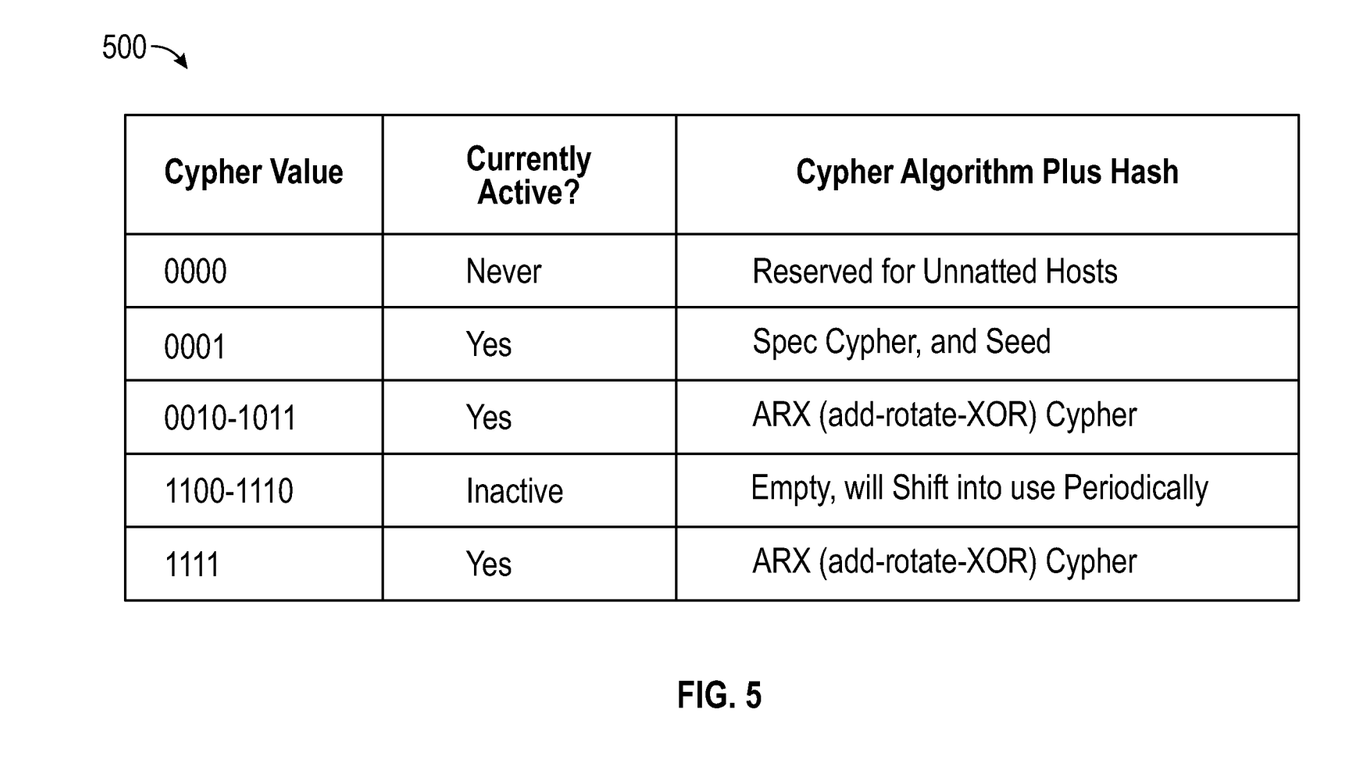
FIG. 5 illustrates a cypher algorithm table.

In other words, when new flows that may be egressing AS 105 on a single device (e.g., first host device 115), the cypher value (e.g., a 4 bit secret from a cypher algorithm table 500 described below) may be assigned. This 4 four bit secret may be used to apply a block cipher (e.g., a cypher algorithm) to transform the source address of that specific flow. This flow may then be known by upstream devices (e.g., second host device 120) outside AS 105 via the transformed source address.

Once computing device 600 assigns the cypher value to the cypher bit range in the network prefix in stage 220, method 200 may continue to stage 230 where computing device 600 may encode the address wherein encoding the address may comprise applying the first cypher algorithm (e.g., plus a hash) to encode a coding bit range in the address that is less significant than the cypher bit range. For example, as shown in FIG. 3, the coding bit range may be within the network prefix. In other embodiments, the coding bit range may be in the network prefix and may extend beyond the network prefix to include at least a portion of the interface ID. In addition, the AS routable prefix may occupy a range of bits in the address that is greater in significance than the cypher bit range.

After computing device 600 encodes the address in stage 230, method 200 may proceed to stage 240 where computing device 600 may use the encoded address for flows from first host device 115 that egress AS 105. For example, the receiver of the flow (e.g., second host device 120) may only know the originating AS (i.e., AS 105), but not first host device 115's unencoded address. Secrets (e.g., the cypher value) may rotate over time, with only the devices within AS 105 knowing the secret at a specific time.

It may also be possible to set the cypher value (e.g., the four bit value) at ingress to AS 105, and the address transformation/obfuscation may happen at egress. This may have the benefit of allowing the ingress router to select elements of the cypher value (e.g., the four bit value) that may drive traffic towards specific ASBR pairs (e.g., if the AS routable prefix plus the cypher value are usable in routing outside AS 105. Once computing device 600 uses the encoded address for flows from first host device 115 that egress AS 105 in stage 240, method 200 may then end at stage 250.

Figure 4:
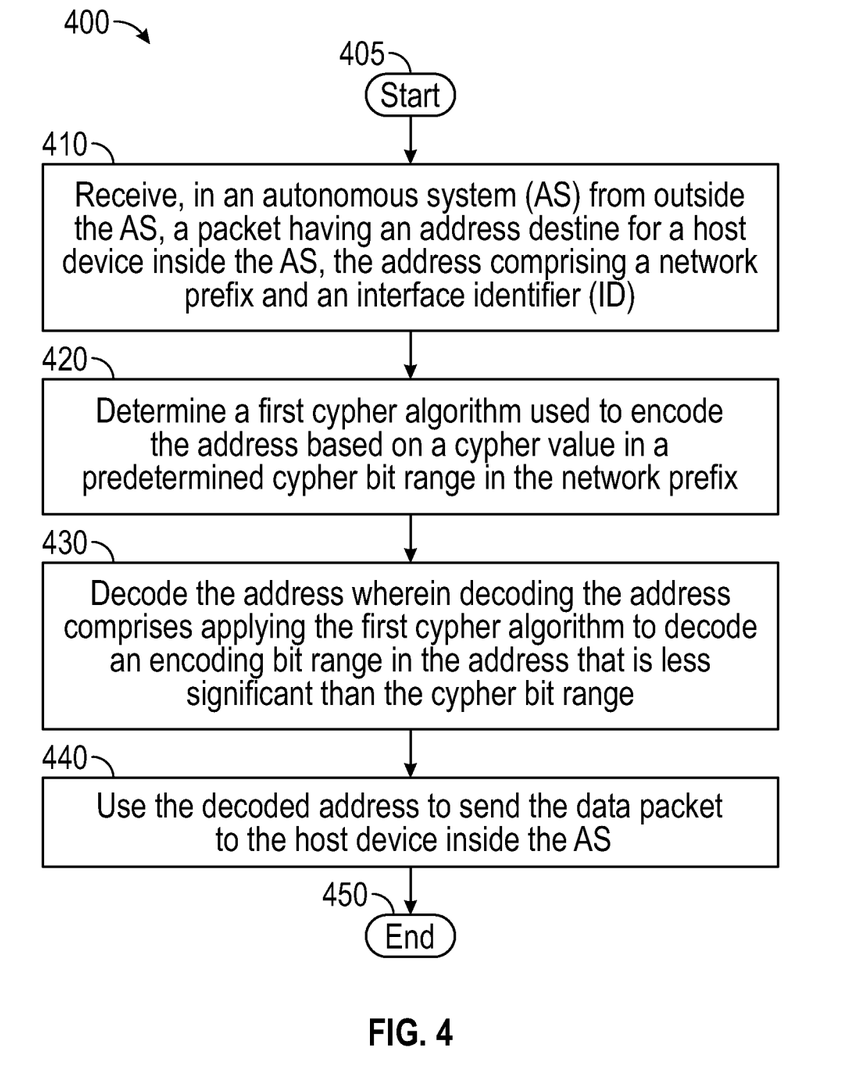
FIG. 4 is a flow chart of a method for decoding an address.

FIG. 4 is a flow chart setting forth the general stages involved in a method 400 consistent with an embodiment of the disclosure for decoding an address. Method 400 may be implemented using PE device 130 as described in more detail above with respect to FIG. 1. Ways to implement the stages of method 400 will be described in greater detail below.

Method 400 may begin at starting block 405 and proceed to stage 410 where PE device 130 may receive, in AS 105 from outside AS 105, a packet having an address destine for first host device 115 inside AS 105. The address may comprise the network prefix and the interface ID. While this pack may have an address destine for first host device 115, at this point it may be encoded, and devices outside AS 105 (e.g., second host device 120) may only know the originating AS, but not first host device 115's unencoded address. For example, the address may follow the format described above with respect to FIG. 3.

From stage 410, where PE device 130 receives, in AS 105 from outside AS 105, the packet having the address destine for first host device 115 inside AS 105, method 400 may advance to stage 420 where PE device 130 may determine a first cypher algorithm used to encode the address based on a cypher value in a predetermined cypher bit range in the network prefix. For example, flows that return in response to AS 105 now have as their destination of the transformed (e.g., encoded) address. This address may be transformed back to the original (e.g., unencoded) address based on information carried in the IP header. This may avoid any stateful needs in this translation function, solving many scale and speed issues. This may allow rotation of the algorithm used to apply at AS 105's boundary without exposing this information to the upstream network (e.g., devices outside AS 105).

Once PE device 130 determines the first cypher algorithm used to encode the address based on the cypher value in the predetermined cypher bit range in the network prefix in stage 420, method 400 may continue to stage 430 where PE device 130 may decode the address. Decoding the address may comprise applying the first cypher algorithm to decode the coding bit range in the address that is less significant than the cypher bit range. For example, for a new flow having the AS routable prefix for AS 105 followed by a non-zero number (e.g., cypher value in the cypher bit range), embodiments of the disclosure may run the first cypher algorithm plus a hash identified by the non-zero number (e.g., cypher value in the cypher bit range) against the coding bit range to rediscover the original address of first host device 115. Then the decoded address may be written including resetting the cypher value (e.g., back to the original "0000"). Because the devices in AS 105 may know the secret and the times that it changes, it may be possible to keep the transformations synchronized across AS 105.

After PE device 130 decodes the address in stage 430, method 400 may proceed to stage 440 where PE device 130 may use the decoded address to send the data packet to first host device 115 inside AS 105. Once PE device 130 use the decoded address to send the data packet to first host device 115 inside AS 105 in stage 440, method 400 may then end at stage 450.

FIG. 5 illustrates a cypher algorithm table 500. As shown in FIG. 5, cypher algorithm table 500 may comprise a cypher value column, a column indicating if the cypher value is currently active, and a description of the algorithm and hash. As stated above, at least one cypher value may comprise a predetermined reserved value (e.g., "0000"). There may be only a certain number of cypher value active at one time allowing others to be transitioned to new algorithms periodically. Consistent with embodiments of the disclosure, before periodically changing a code for a particular cypher value, embodiments of the disclosure may stop allocating new flows to that cypher value. For example, an average Transmission Control Protocol (TCP) flow may comprise 53 seconds, this may allow the majority of flows to run to completion. Furthermore, the destination cipher may also use the destination IP address (or subnet) to determine which cypher algorithm to apply. This may mean that it may not be possible to use another website to determine instantaneously what algorithm is being applied.

The cypher value in the IPv6 address that may need to be reserved to encode the secret, as well as an IPv6 address space size that enables lossless transcoding may be important aspect of the disclosure. The cypher value may be included in each packet following the AS routable prefix that may bring the traffic to AS 105. This secret (e.g., the cypher value) may comprise a time based token in a part of the address to determine which return transform to use for lossless 1:1 address transcoding. This time based token may allow: i) the IPv6 network prefix to be unmodified so that the traffic may return to the AS (e.g., it may also be possible to map to a different prefix as well, as long as the traffic returns to the AS); ii) the interface ID may be unmodified; iii) the remaining bits of the network prefix to be a lossless mapping table to the original address; and iv) devices outside the AS to know when the meaning behind any time based secret to have been changed.

At the network boundary (e.g., PE 130), a cypher value (e.g., a four bit algorithm number) to apply may be chosen randomly once a flow is discovered. New algorithms and hashes (e.g., seeds) may be provided dynamically like a nonce just within a domain. Specific algorithms and seeds may be anything computationally simple enough to enable quick hardware based translation at the network boundary (e.g., PE 130). There may be many algorithms that may be used. They may comprise, for example, Add Rotate XOR (ARX) cyphers or more complex algorithms.

Embodiments of the disclosure may also obfuscate source addresses just to specific peer ASs or destination IP address prefixes. This may have the benefit of being able to use embodiments of the disclosure outside the AS, should this be desirable or hiding the users within a specific country for example.

With embodiments of the disclosure, host devices may automatically choose to invoke AS privacy by selecting one of a multiple available source IP address or prefix it uses (i.e., only some prefixes may be private, and the host device may choose when it wants privacy).

Embodiments of the disclosure may be applied for non-owned AS, non-DHCP provided IP addresses. One way may be with static remapping of addresses at CE to PE ingress. This may be used to selectively drive traffic back through a particular AS.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing stateless address translation at an Autonomous System (AS) boundary for host privacy as described above with respect to FIG. 2 and FIG. 4. Computing device 600, for example, may provide an operating environment for DHCP server 110, first host device 115, second host device 120, first network device 125, PE device 130, or CE device 135. DHCP server 110, first host device 115, second host device 120, first network device 125, PE device 130, and CE device 135 may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   receiving an address associated with a host device in an Autonomous System (AS), the address comprising a network prefix and an interface identifier (ID);
   assigning a cypher value to a cypher bit range in the network prefix, wherein the cypher value is associated with a first cypher algorithm of a plurality of cypher algorithms;
   encoding the address, wherein encoding the address comprises applying the first cypher algorithm to encode a coding bit range in the address that is less significant than the cypher bit range; and
   using the encoded address for flows from the host device that egress the AS.

2. The method of claim 1, wherein the address comprises a 128-bit IPv6 address.

3. The method of claim 1, wherein the coding bit range is within the network prefix.

4. The method of claim 1, wherein the coding bit range is within the interface ID.

5. The method of claim 1, wherein the coding bit range is in the network prefix and extends beyond the network prefix to include at least a portion of the interface ID.

6. The method of claim 1, wherein the address comprises an AS routable prefix associated with the AS that occupies a range of bits in the address that is greater in significance than the cypher bit range.

7. The method of claim 1, further comprising reserving the cypher bit range to be used on the AS.

8. The method of claim 1, further comprising selecting randomly the first cypher algorithm from the plurality of cypher algorithms.

9. The method of claim 1, further comprising periodically changing cypher algorithms within the plurality of cypher algorithms.

10. A system comprising:
    a memory storage; and
    a processing unit coupled to the memory storage, wherein the processing unit is operative to:
      receive, in an Autonomous System (AS) from outside the AS, a packet having an address destine for a host device inside the AS, the address comprising a network prefix and an interface identifier (ID);
      determine a first cypher algorithm used to encode the address based on a cypher value in a predetermined cypher bit range in the network prefix;
      decode the address, wherein decoding the address comprises applying the first cypher algorithm to decode an coding bit range in the address that is less significant than the cypher bit range; and
      use the decoded address to send the data packet to the host device inside the AS.

11. The system of claim 10, wherein the address comprises a 128-bit IPv6 address.

12. The system of claim 10, wherein the coding bit range is within the network prefix.

13. The system of claim 10, wherein the coding bit range is in the network prefix and extends beyond the network prefix to include at least a portion of the interface ID.

14. A computer-readable medium that stores a set of instructions which when executed perform a method executed by the set of instructions comprising:
    receiving an address associated with a host device in an Autonomous System (AS), the address comprising a network prefix and an interface identifier (ID);
    assigning a cypher value to a cypher bit range in the network prefix, wherein the cypher value is associated with a first cypher algorithm of a plurality of cypher algorithms;
    encoding the address, wherein encoding the address comprises applying the first cypher algorithm to encode a coding bit range in the address that is less significant than the cypher bit range; and
    using the encoded address for flows from the host device that egress the AS.

15. The computer-readable medium of claim 14, wherein the address comprises a 128-bit IPv6 address.

16. The computer-readable medium of claim 14, wherein the coding bit range is within the network prefix.

17. The computer-readable medium of claim 14, wherein the coding bit range is in the network prefix and extends beyond the network prefix to include at least a portion of the interface ID.

18. The computer-readable medium of claim 14, wherein the address comprises an AS routable prefix associated with the AS that occupies a range of bits in the address that is greater in significance than the cypher bit range.

19. The computer-readable medium of claim 14, wherein reserving the cypher bit range to be used on the AS.

20. The computer-readable medium of claim 14, further comprising selecting randomly the first cypher algorithm from the plurality of cypher algorithms.

* * * * *